US009544326B2

(12) United States Patent
Hershey et al.

(10) Patent No.: US 9,544,326 B2
(45) Date of Patent: \*Jan. 10, 2017

(54) DIGITAL WEAPONS FACTORY AND DIGITAL OPERATIONS CENTER FOR PRODUCING, DEPLOYING, ASSESSING, AND MANAGING DIGITAL DEFECTS

(71) Applicant: Raytheon Company, Waltham, MA (US)

(72) Inventors: Paul C. Hershey, Ashburn, VA (US); Robert E. Dehnert, Jr., Dulles, VA (US); John J. Williams, Dulles, VA (US)

(73) Assignee: Raytheon Company, Waltham, MA (US)

( \* ) Notice: Subject to any disclaimer, the term of this patent is extended or adjusted under 35 U.S.C. 154(b) by 122 days.

This patent is subject to a terminal disclaimer.

(21) Appl. No.: 14/600,880

(22) Filed: Jan. 20, 2015

(65) Prior Publication Data

US 2016/0269435 A1 Sep. 15, 2016

Related U.S. Application Data

(60) Provisional application No. 61/929,247, filed on Jan. 20, 2014.

(51) Int. Cl.
*B64D 1/04* (2006.01)
*H04L 29/06* (2006.01)
*F41H 11/00* (2006.01)

(52) U.S. Cl.
CPC .......... *H04L 63/1433* (2013.01); *F41H 11/00* (2013.01); *H04L 63/1416* (2013.01)

(58) Field of Classification Search
USPC ..... 89/1.11, 1.1; 706/14, 919; 717/100, 104, 717/106
See application file for complete search history.

(56) References Cited

U.S. PATENT DOCUMENTS 7,151,447 B1 \* 12/2006 Willms .............. G08B 13/1654
250/390.04
2014/0279809 A1 9/2014 Hershey et al.
(Continued)

OTHER PUBLICATIONS

Kopp, Carlo, "High Energy Laser Directed Energy Weapons Technical Report, APA-TR-2008-0501", May 2008, Defense Today, 2006 series, Updated Apr. 2012, Copyright 2006-2012 Carlo Kopp.
(Continued)

*Primary Examiner* — J. Woodrow Eldred
(74) *Attorney, Agent, or Firm* — Renner, Otto, Boisselle & Sklar, LLP

(57) ABSTRACT

A method of rapidly producing a new cyber response tool (e.g., in near-real-time) by matching vulnerabilities of enemy threats (e.g., a missile and/or a tank) to corresponding portions of other response tools that effectively exploit the matched vulnerability. An iterative framework may be utilized to repeatedly prioritize a set of cyber response tools based on a corresponding probability of success. For example, a computer or computer network may implement the iterative framework to carry out the probability computation and corresponding cyber response tool prioritization. If a total probability of success is below a given threshold (e.g., 95%), then creation of one or more new cyber response tools may be initiated. The probability of success may be a function of time (e.g., ten minutes before an expected launch) and/or a function of a phase of a lifecycle of the enemy threat (e.g., a launch phase).

20 Claims, 10 Drawing Sheets

(56) References Cited

U.S. PATENT DOCUMENTS

| | | | |
|---|---|---|---|
| 2014/0283064 A1* | 9/2014 | Fraize | H04L 63/0227 726/23 |
| 2015/0205760 A1 | 7/2015 | Hershey et al. | |
| 2015/0295948 A1* | 10/2015 | Hassell | H04L 63/1441 726/25 |
| 2015/0358337 A1* | 12/2015 | Keller | H04W 12/12 726/23 |
| 2016/0080419 A1* | 3/2016 | Schiappa | H04L 63/20 726/1 |

OTHER PUBLICATIONS

Shein, Rob, "A Brief Summary of Cyber Warfare," Information Security Management Handbook, Sixth Edition, vol. 4, edited by Harold F. Tipton and Micki Krause Nozaki, Auerbach Publications, 2010. Copyright 2011-2013 Auerbach Publications.

Defense Science Board, "Task Force Report: Resilient Military Systems and the Advanced Cyber Threat," Jan. 2013, Office of the Under Secretary of Defense for Acquisition, Technology, and Logistics, Washington, D.C.

Missile Defense Agency, "Ballistic Missile Defense Program Overview for the National Defense Industrial Association", May 8, 2008, 08-MDA-3495.

Hershey, P. et al., "A Policy-based Approach to Automated Data Reduction for Intelligence, Surveillance, and Reconnaissance Systems," Copyright 2013, IEEE.

Claims for Hershey, P. et al., "Mathematical Method for Non-kinetic Performance Assessment (M2NPA)," U.S. Appl. No. 14/185,029, filed Feb. 20, 2014.

Nortzel, L., "China's Military Modernization and Cyber Activities," Spring 2014, Strategic Studies Quarterly, vol. 8, No. 1, ISSN 1936-1815, pp. 3-22.

Weiner, S. et al., "Discrimination Performance Requirements for Ballistic Missile Defense," vol. 7, No. 1, 1994, The Lincoln Laboratory Journal, pp. 63-88.

Wilkening, D., "A Simple Model for Calculating Ballistic Missile Defense Effectiveness," Science and Global Security, 1999, vol. 8.2, pp. 183-215.

Peterson, Joshua J., "Appropriate Factors to Consider when Assessing Analytic Confidence in Intelligence Analysis," 2008, Erie, PA: Mercyhurst College.

U.S. Army, "Human Intelligence Collector Operations", Sep. 2006, Field Manual, 202203, Washington, DC: Department of Army.

Robertson, Matthew, "Chinese 'Carrier Killer' Based on US Technology", The Epoch Times. [Online] Jun. 28, 2011, [Cited: Feb. 15, 2013] http://www.theepochtimes.com/n2/china-news/chinese-canier-killer-based-on-us-technology-57974.html.

"ExtendSim 9 Reference," accessed Nov. 8, 2013, Copyright © 2013 by Imagine That Inc., https://www.extendsim.com/downloads/forms/install_instrucs/ExtendSim%209%20Reference.pdf.

Ishikawa, K. (1968), Guide to Quality Control (Japanese): Gemba No QC Shuho, Tokyo: JUSE Press, Ltd. (check).

Ishikawa, K (1990), Introduction to Quality Control. (Translation).

Jousselme, Anne-Laure, Dr., "Fusion challenges for target identification under uncertainty," Dec. 2013, DRDC—Valcartier, Command, Control and Intelligence section, RCAF Avionics and Systems Workshop, Ottawa, Canada.

Klir et al., "Uncertainty and Information, Foundations of Generalized Information Theory," Binghamton University—SUNY, Wiley Interscience, Copyright 2006 by John Wiley & Sons, Inc.

Ristic, B. et al., "Target Classification Approach Based on the Belief Function Theory," Apr. 2005, IEEE Trans. on Aerospace and Electronic Systems, vol. 4, No. 2.

Technical Characteristics of the NATO Identification System (NIS), Feb. 11, 2009, NATO STANAG 4162—ED 2.

NATO Standard Identity Description Structure for Tactical Use, (2005), STANAG 1241 Ed. 5.

Nato Industrial Advisory Group (NIAG), Update for NDIA International Division, Jul. 10, 2013.

Claims for Hershey, P. et al., "Systems and Method for Asymmetric Missile Defense," U.S. Appl. No. 61/929,252, filed Jan. 20, 2014, U.S. Appl. No. 14/600,920.

* cited by examiner

DIGITAL WEAPONS FACTORY AND DIGITAL OPERATIONS CENTER FOR PRODUCING, DEPLOYING, ASSESSING, AND MANAGING DIGITAL DEFECTS

RELATED APPLICATIONS

This application claims the benefit of U.S. Provisional Application No. 61/929,247 filed Jan. 20, 2014, which is hereby incorporated herein by reference in its entirety.

Also, this application is related to two commonly-assigned concurrently-filed applications, "System and Method for Asymmetric Missile Defense" U.S. application Ser. No. 14/600,920, which is hereby incorporated herein by reference in its entirety; and "Process of Probabilistic Multi-Source Multi-INT Fusion Benefit Analysis" U.S. application Ser. No. 14/600,904, which is hereby incorporated herein by reference in its entirety.

BACKGROUND

Continued proliferation of long range missiles and the fielding of sophisticated threats, such as the maneuvering re-entry vehicle, pose challenges for the fielded Ballistic Missile Defense System (BMDS) weapon systems. However, as missile defense has evolved from World War II to the present day, the advent of the digital age and the emergence of a wide variety of non-kinetic techniques create asymmetric opportunities to augment the BMDS to assist in negation of ballistic missile threats and to rapidly inject intelligence surveillance and reconnaissance (ISR) actionable decision aids into the often stressful offensive and defensive battle operations.

Kinetic techniques involve projectile weapons (e.g., such as guns, missiles, and bombs) that destroy targets by kinetic effects (e.g., overpressure, projectile, shrapnel and spalling damage, and incendiary effects). Kinetic weapons may use stored chemical energy in propellants and warhead explosives and deliver this energy to a target by means of a projectile of some kind.

Non-kinetic techniques involve digital and electronic weapons that generally do not induce direct physical harm to people. For example, non-kinetic techniques include cyber, electronic warfare (EW), and decoys. Cyber weapons are delivered digitally and attack target systems via computer software. Electronic warfare weapons attack systems via signals and energy. Electronic warfare weapons include direct energy (DE) weapons that deliver a large amount of stored energy from the weapon to the target, to produce structural and incendiary damage effects; high-power microwave signals; charge particle beams; and high energy lasers. Decoys are defense measures that direct the enemy threat safely away from the primary target.

Currently, there are analytical solutions to provide performance assessment of the kinetic solutions. For example, probability of single shot engagement kill, PSSEK, which is a measure the effectiveness that is used in these analytical approaches, is derived considering only kinetic means to neutralize the ballistic missile threat. PSSEK factors in the reliability of the combat system, the reliability of the interceptor, and the ability of the interceptor to intercept the re-entry vehicle (RV) of the missile. PSSEK expresses the reliability of the combat system operating correctly, and the probability of the interceptor neutralizing the threat.

In addition to the probabilistic approach to characterizing PSSEK, there have been scoring systems developed to assess vulnerabilities of kinetic weapons (e.g. missiles). These systems prioritize vulnerabilities and identify those that pose the greatest risk. One such scoring system is the common vulnerability scoring system (CVSS) that provides an open framework within which to score vulnerabilities. CVSS provides standardized vulnerability scores. When an organization normalizes vulnerability scores across its software and hardware platforms, it can leverage a vulnerability management policy. This policy may be similar to a service level agreement (SLA) that states how quickly a particular vulnerability must be validated and remediated.

However, the current methods to create tools to attack vulnerabilities with a high rate of success can take months to create. Furthermore, there are no prior or existing solutions from which to build an effective response to the cyber threat to include elements of deterrence, mission assurance and offensive cyber capabilities.

SUMMARY OF INVENTION

The present invention provides a method of rapidly producing a new cyber response tool (e.g., in near-real-time) by matching vulnerabilities of enemy threats (e.g., a missile and/or a tank) to corresponding portions of other response tools that effectively exploit the matched vulnerability. An iterative framework may be utilized to repeatedly prioritize a set of cyber response tools based on a corresponding probability of success. For example, a computer or computer network may implement the iterative framework to carry out the probability computation and corresponding cyber response tool prioritization. If a total probability of success is below a given threshold (e.g., 95%), then creation of one or more new cyber response tools may be initiated. The probability of success may be a function of time (e.g., ten minutes before an expected launch) and/or a function of a phase of a lifecycle of the enemy threat (e.g., a launch phase).

Embodiments provide a system that produces, deploys, assesses and manages non-kinetic capabilities and techniques that take the form of digital defects (e.g., digital weapons) for the purpose of defeating threats that previously could only be defeated using kinetic techniques. For example, missile defense may include reducing a size of a missile raid.

A computer or computer network can utilize the method of rapidly producing new cyber response tools to utilize sensors to detect enemy threat objects and create new cyber response tools, store the cyber response tools, analyze the cyber response tools in view of the below description, and/or implement the cyber response tool. For example, the cyber response tool may be implemented by retrieving the cyber response tools from a memory storage and sending the cyber response tool over an electronic communications system to another electronic device to exploit a vulnerability in the electronic device. Once implemented, the sensors may be implemented to verify the effectiveness of the cyber response tool.

An aspect of the invention includes automatically producing a plurality of cyber response tools. For example, 1000 new cyber response tools may be produced within an hour.

Another aspect of the invention includes determining whether a cyber response tool may be effective against an enemy threat.

According to one aspect of the invention, a method of rapidly producing a cyber response tool, the method comprising detecting a threat object, during a first phase, with one or more sensor platforms, modeling a lifecycle of the detected threat object, identifying vulnerabilities of the lifecycle based on the model, providing a set of cyber response tools, determining whether each cyber response tool of a set of cyber response tools is effective in exploiting and manipulating the threat vulnerabilities based on an observation of the effectiveness of the cyber response tool by the one or more sensor platforms, identifying one or more effective portions of one or more of the cyber response tools that correspond to the identified vulnerabilities, creating a new cyber response tool based on the identified vulnerabilities and the one or more effective portions, and applying the new cyber response tool to the threat object and/or to a device that is operatively connectable to the threat object. Any of the above aspects may include any of the below features individually or in combination.

Determining whether each cyber response tool is effective may be a function of a probability of success of the cyber response tool against the enemy threat object.

The probability of success may be a function of a second phase of the threat object.

The probability of success may be based on a first time period.

The threat object may include a missile.

The first time period may be an amount of time before an expected launch of the missile.

The threat object may include a missile and the second phase may be a deployment of the missile.

Determining whether each cyber response tool is effective may determine that none of the cyber response tools is effective.

Identifying one or more effective portions may be a function of a current phase of the threat object.

Identifying one or more effective portions may be a function of time.

Identifying one or more effective portions may include identifying a digital control system attack that is effective for attacking a control system module of the threat object.

Creating a new cyber response tool may include combining a portion of the digital control system attack with another portion of another cyber response tool.

The new cyber response tool may include a computer virus.

Applying the new cyber response tool may include sending the cyber response tool through a computer network to a digital module in the threat object.

Applying the new cyber response tool may include sending the cyber response tool through a computer network to a manufacturing device configured to manufacture a portion of the threat object.

The new cyber response tool may include a plurality of portions cyber response tools from the set of cyber response tools.

Creating a new cyber response tool may include creating a plurality of new cyber response tools within an hour.

The method of rapidly producing a cyber response tool may comprise determining that the plurality of new cyber response tools is effective against one or more of the identified vulnerabilities.

Modeling the lifecycle may include a plurality of phases of the threat object.

According to another aspect of the invention, a method of rapidly producing a cyber response tool, the method comprising detecting a threat object, during a first phase, with one or more sensor platforms, modeling a lifecycle of the detected threat object, identifying vulnerabilities of the lifecycle based on the model, searching for a cyber response tool in a set of cyber response tools in a database, determining whether each cyber response tool of a set of cyber response tools is effective in exploiting and manipulating the threat vulnerabilities based on an observation of the effectiveness of the cyber response tool by the one or more sensor platforms, identifying one or more effective portions of one or more of the cyber response tools that correspond to the identified vulnerabilities, creating a new cyber response tool based on the identified vulnerabilities and the one or more effective portions, and applying the new cyber response tool to the threat object and/or to a device that is operatively connectable to the threat object. The above aspect may include any of the above features individually or in combination.

According to yet another aspect of the invention, a system for rapidly producing a cyber response tool, the system comprising a detection module for detecting a threat object, during a first phase, with one or more sensor platforms, a modeling module for modeling a lifecycle of the detected threat object, an identification module for identifying vulnerabilities of the lifecycle based on the model, a storage module for providing a set of cyber response tools, a determination module for determining whether each cyber response tool of a set of cyber response tools is effective in exploiting and manipulating the threat vulnerabilities based on an observation of the effectiveness of the cyber response tool by the one or more sensor platforms, a second identification module for identifying one or more effective portions of one or more of the cyber response tools that correspond to the identified vulnerabilities, a matching module for creating a new cyber response tool based on the identified vulnerabilities and the one or more effective portions, and an implementation module for applying the new cyber response tool to the threat object and/or to a device that is operatively connectable to the threat object. The above aspect may include any of the above features individually or in combination.

The foregoing and other features of the invention are hereinafter described in greater detail with reference to the accompanying drawings.

DETAILED DESCRIPTION

The principles of this present application have particular application to digital weapons for attacking vulnerabilities in an enemy system, and thus will be described below chiefly in this context. It will of course be appreciated, and also understood, that principles of this invention may be applicable to other enemy tools and/or systems.

Figure 1:
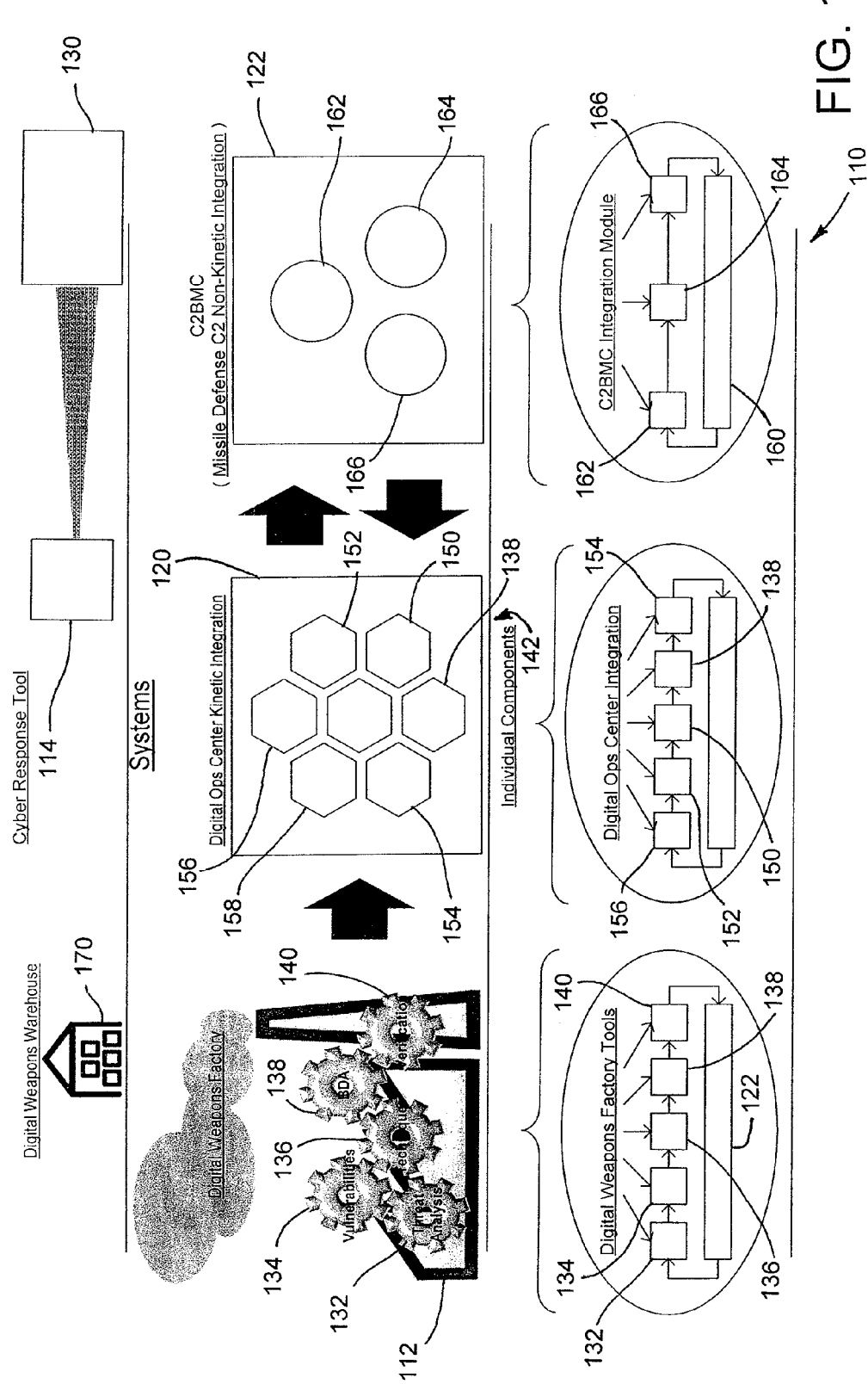
FIG. 1 is a flow chart of an exemplary defense system including an exemplary digital weapons factory.

FIG. 1 is a flow chart of an exemplary defense system 110 including an exemplary digital weapons factory 112. The defense system 110 may also include a digital operations center 120 in communication with the digital weapons factory 112 and command, control, battle management, and communications (C2BMC) 122 in communication with the digital operations center 120.

The digital weapons factory 112 may produce a cyber response tool 114 (e.g., a computer virus, worm, digital exploit, and/or digital defect) based on results from an integrated analysis of an enemy threat 130 (e.g., a missile). For example, the cyber response tool 114 may be based on results from the system and methods described in U.S. application Ser. No. 14/481,288 filed Sep. 9, 2014, which is hereby incorporated herein by reference in its entirety; and/or may be based on results from the system and methods described in U.S. application Ser. No. 14/185,029 filed Feb. 20, 2014, which is hereby incorporated herein by reference in its entirety. The digital weapons factory 112 may include threat analysis 132, vulnerability assessment 134, techniques assessment 136 (e.g., matching of cyber response tools 114 to vulnerabilities) to exploit and/or manipulate relevant vulnerabilities of the enemy threat 130, identification of battle damage assessment (BDA) 138 capabilities to validate the deployment of the cyber response tools 114, and identification of verification 140 capabilities to determine whether or not the deployed cyber response tools have been mitigated.

At the lowest level, the digital weapons factory 112 may apply an asymmetric missile defense method and/or an analytical assessment framework 210, as exemplified in concurrently-filed U.S. Application, "System and Method for Asymmetric Missile Defense." The analytical assessment framework 210 may include a portion of an AMD Mission Thread Analysis framework (MTAM), and is discussed briefly below relating to FIG. 2.

The applied methods may identify the enemy threat 130, its associated vulnerabilities 134 and the cyber techniques 136 to exploit and manipulation those vulnerabilities 134. Identification of the BDA 138 and verification 140 capabilities may ensure that the techniques 136 were successfully deployed and remain unmitigated. Table 1, below, provides an exemplary matching of components that the digital weapons factory 112 may utilize and associated tools that may be used within the digital weapons factory 112 to meet a desired outcome of a mission (e.g., a requirement to negate a missile threat).

TABLE 1

Digital weapons factory 112 Components 142 That Align With the and Exemplary Tools of Each Component

| Components | Tool | |
|---|---|---|
| Enterprise and System Vulnerability Assessment Component Vulnerability Assessment | Open Source Intelligence (OSINT), Reverse Program Protection Planning Failure Mode Effects Analysis (FMEA), Cyber Vulnerability Assessment | Digital Kill Chain |
| Develop Exploit | Cyber Exploitation | |
| Develop Manipulation | Cyber Manipulation | |
| Develop BDA Scheme | Processing Exploitation, Dissemination (PED), Automatic Target Recognition (ATR) | |
| Develop Verification Scheme | Activity Based Intelligence (ABI) | |
| Systems Integration Framework | Data Broker Reasoner (DBR) | |

Figure 3:
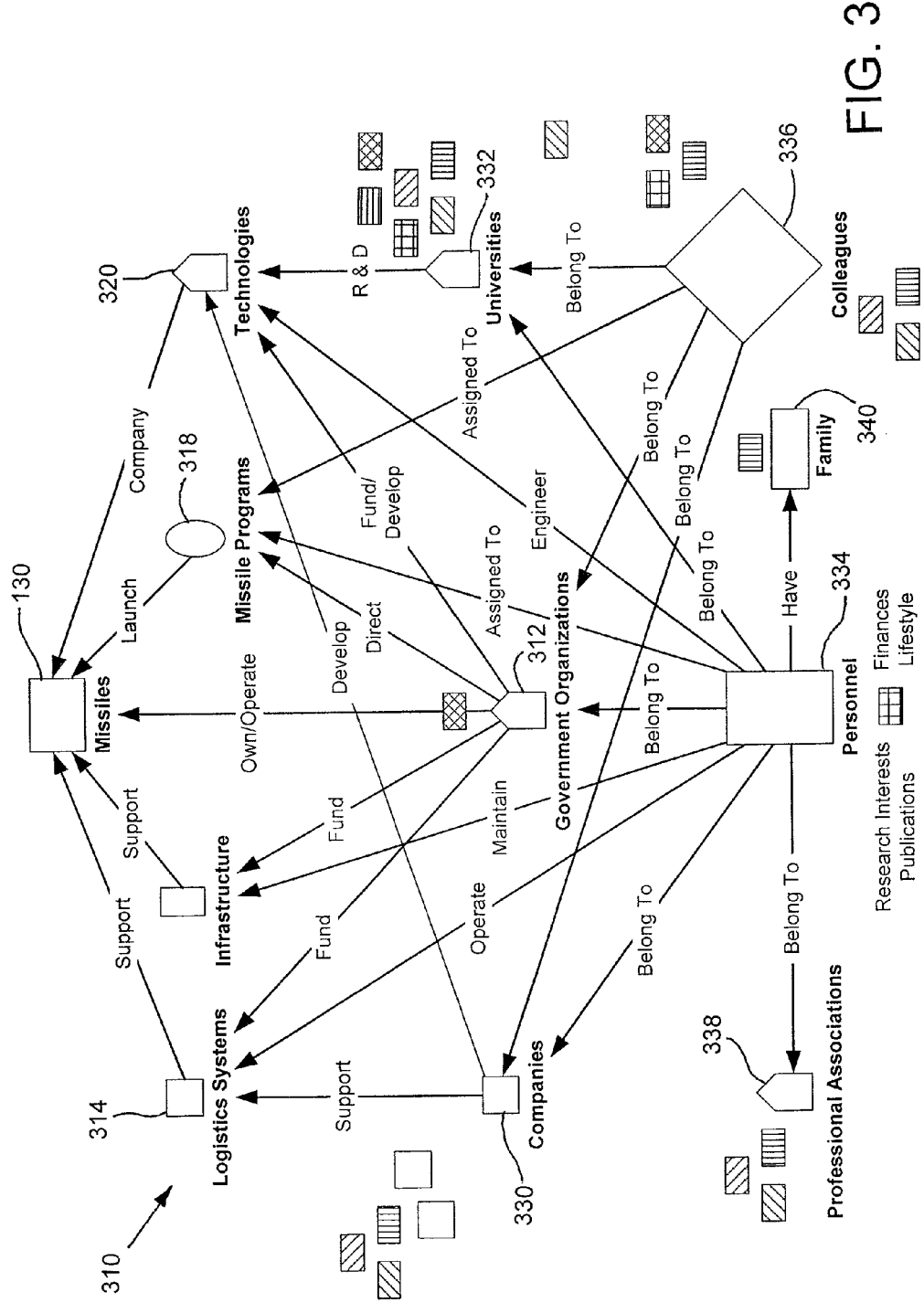
FIG. 3 is a conceptual model of a lifecycle of a missile targeted by the digital weapons factory of FIG. 1.

The first step in producing a cyber response tool may be to identify the relevant threat and then research the threat through the open source intelligence (OSINT) process that applies analytical capabilities through non-attributable networks and personas. In the case of missile systems, modeling may be a source of conducting threat research. For example, a model, as shown in FIG. 3, may be created for one of more social networks surrounding all phases of life for a missile system: requirements development, critical technology development (research and development), manufacturing and testing, deployment, operations and maintenance, and training exercises. Each phase may include associations branching further away from the system under study. Security may be less robust for associations further away from the system under study compared to associations closer to the system.

The next step in the digital weapons factory process 112 may be to match the vulnerabilities identified (shown in table 3 below) through the FMEA process with the cyber response tools 114 that may be used to exploit and manipulate them. As part of this process, the digital weapons factory 112 may categorize the types of attacks to create the basic format and contents for the cyber response tool 114 inventories (e.g., digital weapons warehouse 170) that may be used.

The digital operations center 120 may include combat operations 150, combat planning 152, missile defense 154, battle damage assessment 138 (e.g., assessing the success or failure of the cyber response tool 114 with intelligence, surveillance, and reconnaissance (ISR)), combat strategy 156, and U.S. Code Title 50 identified at 158. The digital operations center 120 may control deployment and initial assessment of the cyber response tool 114 and battle damage assessment techniques 138 and verification capabilities 140. For example, the digital operations center 120 may utilize the AMD framework to match a guidance system vulnerability in a missile with a cyber response tool 114 that is capable of exploiting the guidance system vulnerability.

The digital operations center 120 may also conduct verification steps (e.g., verification steps from the AMD framework) to ensure the deployed cyber weapons continue to perform and are not mitigated. The verification process may apply activity based intelligence (ABI) and change detection (CD) techniques to verify that the exploitation techniques continue to be effective in negating the enemy missile threat. An example of an ABI multi-INT analytics platform 634 (shown in FIG. 6) for verification is the Intersect Sentry™ (discussed in the concurrently-filed U.S. Application, "System and Method for Asymmetric Missile Defense"), which provides an open source, open standards solution that enables analysts to automate the discovery of important activities. Intersect Sentry™ may operate on multiple systems and process data from across the United States.

The command, control, battle management, and communications (C2BMC) 122 operations center may include command and control functions that enable the a traditional kinetic missile defense systems. The command, control, battle management, and communications 122 may include a command, control, battle management, and communications integration module 160 (C2BMC IM) that communicates with planning 162, battle management 164, and situational awareness 166. Table 2, below, provides an exemplary matching of command, control, battle management, and communications 122 components with tools that meet requirements of the components.

TABLE 2

C2BMC IM Components and Associated Tools

| Component | Tool |
| --- | --- |
| Common Measure of Effectiveness/Measure of Performance | |
| Resourcing | Common Vulnerability Scoring Systems (CVSS)Math Tool, ExtendSim |
| Planning Execution/ Battle Management | Math Tool, ExtendSim |
| Missile Defense SA, Battle Management | Raytheon Missile Defense Tool (RMDTool) Advanced Modeling and Simulation Environment (AMSE) |
| Systems Integration Framework | Data Broker Reasoner (DBR), |

The command, control, battle management, and communications integration module 122 allows integration of the digital weapons factory 112, the digital operations center 120, and the command, control, battle management, and communications 122 systems through the application of phases of the analytical assessment framework 210, mentioned above and described further in FIG. 2.

Figure 2:
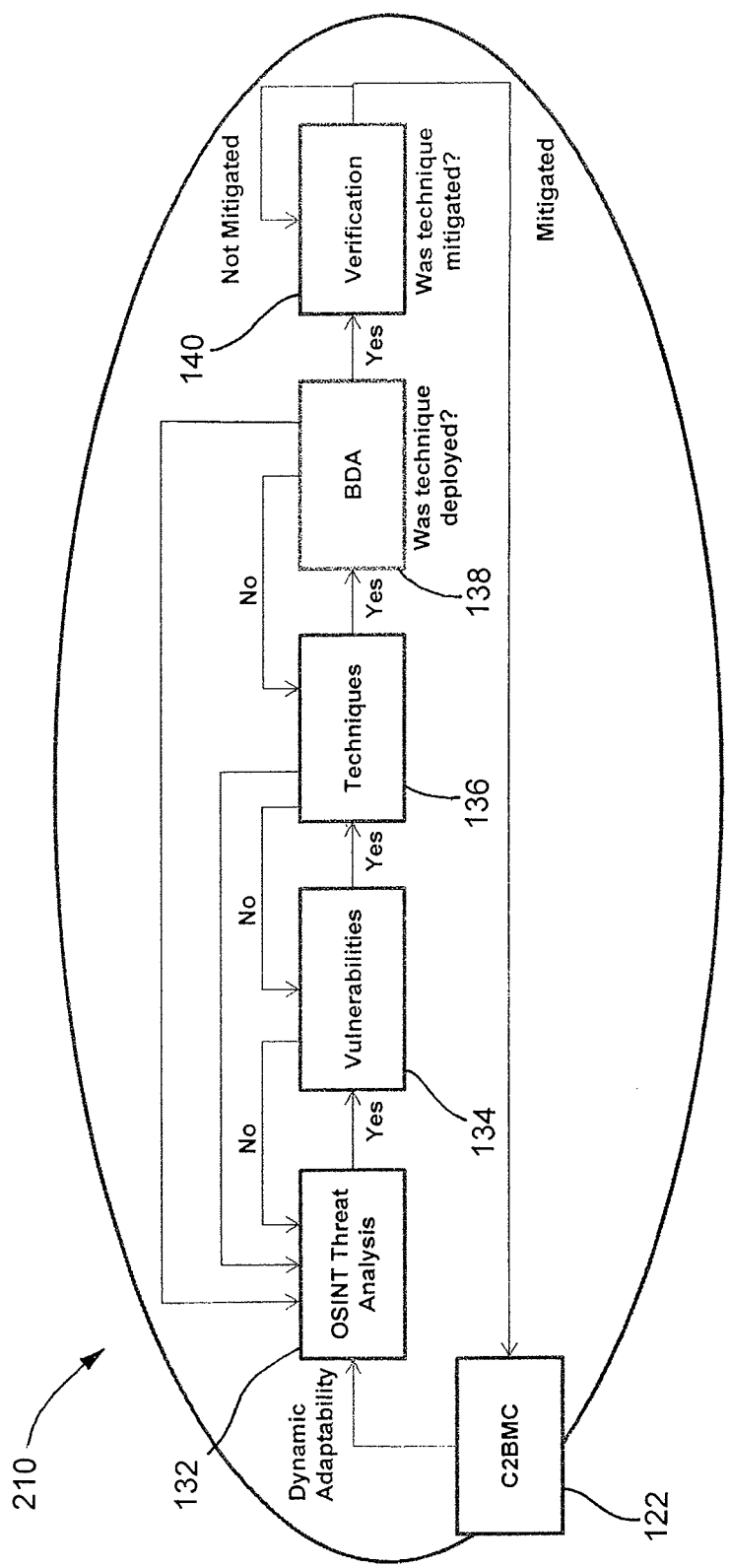
FIG. 2 is a flow chart of an analytical assessment framework providing feedback to and from command and control, battle management, and communications (C2BMC) of the digital weapons factory of FIG. 1.

FIG. 2 is a flow chart of an analytical assessment framework 210 providing feedback to and from command and control, battle management, and communications (C2BMC) of the digital weapons factory 112 of FIG. 1.

The OSINT threat assessment 132 may use open sources to collect unclassified intelligence about the threat. The vulnerability assessment 134 may use lessons learned to identify vulnerabilities associated with the threat. The techniques assessment 136 may identify techniques and capabilities to exploit and manipulate the vulnerabilities. The battle damage assessment 138 may prove that the techniques were deployed and were initially successful. The verification assessment 140 may show that the deployed techniques remain effective and, if mitigated, provide feedback to C2BMC 122. The feedback to and from the C2BMC 122 may ensure an integrated solution to missile defense in which AMD provides vital input.

The analytical assessment framework 210 may be interactive at each step to allow real-time adaptability to a dynamically changing mission environment. The analytical assessment framework 210 may provide a complete missile defense thread through which AMD may provide a non-kinetic technique to negate one or more identified threats 130 (FIG. 1). The OSINT threat process phase 132 may apply any suitable OSINT analysis techniques (e.g., a RAYTHEON® OSINT analysis technique). These analytical techniques may use non-attributable networks and personas to research customer directed topics with a level of anonymity that facilitates continued research without raising suspicion. In the case of missile systems, the technique may not directly research the missile due to significant security barriers and potential to raise an adversary's awareness of the investigation. Also, if the opponent becomes aware of the research, the possibility of misinformation becomes possible. Hence, vetting of data and understanding source reliability alongside information reliability may remain central to the quality of the OSINT analysis.

Modeling provides a method of developing topics for research. For example, a model, as shown in FIG. 3, may be created for one of more social networks surrounding all phases of life for a missile system: requirements development, critical technology development (e.g., research and development), manufacturing and testing, deployment, operations and maintenance, and training exercises. Each phase may include associations branching further away from the system under study. Security may be less robust for associations further away from the system under study compared to associations closer to the system.

FIG. 3 is a conceptual model of a lifecycle 310 of the enemy threat 130 (e.g., missile) targeted by the analytical assessment framework 210. The lifecycle 310 may include relationships between the missile 130, its closest activities (e.g., government 312, logistics 314, infrastructure 316, programs 318, and/or technologies 320), and/or next tier associations (e.g., companies 330, universities 332, personnel 334, colleagues 336, professional associations 338, and/or family 340). Additional elements of the lifecycle 310 may be added for OSINT researchers within an OSINT analytical cell.

The vulnerabilities process phase 134 may provide a vulnerabilities assessment function. The vulnerability assessment function may entail working with the customer community and subject matter experts (SMEs) to develop a greater understanding of a target space, to include all AMD layers from manufacturing to deployment to the terminal phase, as discussed in the concurrently-filed U.S. Application, "System and Method for Asymmetric Missile Defense." Vulnerability assessment may include simulations, hardware testing, and/or historical data from actual events in a given area of interest, such as a battle region.

For example, participants from a plurality of engineering departments with company (e.g., Supply Chain, Manufacturing, Quality Assurance, Operations and Maintenance, and/or Cyber Security) may produce a vulnerability report that provides a threat-specific vulnerabilities assessment for a single maneuvering reentry vehicle (MaRV) threat, such as a threat from a mobile medium range ballistic missile (MRBM) system which initially deployed with a single MaRV capable of hitting an object the size of an aircraft carrier, from distances of up to 3000 km away.

The participants may identify and analyze threat-specific vulnerabilities. Also, a probability of negation (Pn) may be derived based on matching each vulnerability with a corresponding exploitation technique (e.g., a cyber exploitation technique). Pn is defined as probability to deter an adversary from performing a specific action that is directly related to an ability to detect opportunistic events leading up to the specific action and the ability to affect the opportunistic events. For each vulnerability/technique intersection (VT), the probability of negation (Pn) is calculated by multiplying the probability of effectiveness (Pe), and probability of deployment (Pd) for that VT. The values of Pd and Pe may be determined by a combination of actual data and solicitation of information from subject matter experts via a rule-based value derivation process (e.g., FMEA. An example FMEA report is provided in Table 3, below.

TABLE 3

FMEA Structure (Vulnerability Area: Acceptance Test/QA)

Component #3: Probability of
Effectiveness (Pe): category B2

| | |
|---|---|
| Defects | Bad Tooling/Fixtures: Wrong Material; Incorrect Calibration; Wrong Dimensions; Wrong Torque Values/Calibration |
| Function | Product Acceptance |
| Operation Mode | In-Flight (Dynamic Environment); Transport to Launch; Vibration |
| Failure Mode and Cause: | Incorrect production dimensions/fit problems/over or under-torqued fasteners/Spoof: Falsify material specs, torque calibration or dimensional calibration |
| Failure Effect: | Latent Failure |
| Severity | 1-4: Could slow production or cause rework if discovered |
| Detection Methods | 100% visual inspection/calibration cycle |

Table 3 provides exemplary information and allows additional information to be incorporated provide a more detailed and accurate analysis. For example, government employees may add input to gain their perspective, experience, and data.

Referring again to FIG. 2, the technique process phase 136 may identify techniques through which to exploit the vulnerabilities identified during the vulnerability process phase 134. The technique process phase 136 is exemplified in U.S. application Ser. No. 14/481,288 filed Sep. 9, 2014. For example, the exploitation techniques may be cyber-attack capabilities. As part of this process, the types of attacks may be categorized to create a basic format and contents for a cyber weapons inventory to be used or stored (e.g., stored in a database). The technique process phase 136 may also include a development of basic attack models where each attack model represents a description of a linkage between a specific system vulnerability and one or more corresponding attack mechanisms that can applied to that vulnerability.

The technique process phase 136 allows set up of something equivalent to a "zero day" common vulnerability enumeration (CVE) model format to enumerate mission-specific attacks. These models may be used to support cyber modeling tools. Given results from an AMD Threats 132, vulnerabilities 134, and techniques 136 phases, performed as part of a vulnerability assessment, the digital weapons factory 112 may then perform the following subtasks as part of the techniques process phase 136: identify potential attack vector types across the various subsystems components throughout one or more AMD layers; define types of exploitation techniques to be applied across the attack vector types; build and document "CVE-like" models based on exploitation techniques; and/or determine integration points with the cyber modeling tools.

Also, the techniques process phase 136 may include a "system thread analysis." System thread analysis may include defining and ranking exploits targeted at the vulnerabilities identified in one of the subsystem threads. For each exploit a team may document: an operational phase at which the exploit may be employed against the target; a time required to deploy and activate the technique(s); an intelligence support required to support the technique; an expected effect on the target; one or more potential secondary/tertiary effects; one or more methods for measuring battle damage assessment for a given technique; and/or an expected probability of success.

The digital weapons factory 112 may identify and document as many exploits as possible within the time allotted. The list may be used to define a potential weapons inventory for the study. The vulnerabilities may be registered using the CVE models for incorporation into the cyber modeling tool. The output may be in the form of viewgraphs documenting the details described above. After the cyber response tools 114 are produced by the digital weapons factory 112, they are stored in the digital weapons warehouse 170 (e.g., a database), where they may be accessible for deployment by the digital operations center 120.

The battle damage assessment phase 138 may use ISR assets and associated algorithms and techniques to validate that techniques deployed to exploit the threat vulnerabilities have been initially successful. The techniques may include a combination of processing exploitation and dissemination (PED) algorithms (e.g., activity based intelligence (ABI), screening, automatic target recognition (ATR), change detection (CD)), sensors (e.g., EO, IR, SAR), and/or platforms that carry the sensors (e.g., air breathing space-based). For example, Table 4 provides a selection of air breathing ISR Assets that can be implemented for the battle damage assessment phase 138.

TABLE 4

Air-Breathing ISR Assets

| System | Platform | Sensor |
|---|---|---|
| AF DCGS | U2 | EO |
| | | IR |
| | | SYERS (2) |
| | | ACES |
| | | GMTI |
| | GH Blks | EO |
| | | IR |
| | | GMTI |
| | Rivet Joint | EUNT |
| | | COMINT |
| | Liberty | SIGINT |
| | | FMV |
| | Blue Devil | SIGINT |
| | | FMV |
| Navy CANES/ DCGS-N | GH BAMS | Radar |
| | | ESM |
| | | AIS |
| | | EO |
| | | IR |
| | P3 | FMV |
| | | GMTI |
| | | COMINT |
| | | Acoustic |
| | | Magnetometer |
| | F18 | FMV |
| | AEGIS | Radar |
| | SSN-USA | Sonar |
| Army DCGS-A | Shadow | FMV |
| | Hunter | FMV |
| | MARRS | SIGINT |
| | | FMV |
| | Guardrail | SIGINT |
| | | ELINT |
| | | COMINT |
| | Constant Hawk | FMV-Wide Area |
| | Enhanced Trackwolf | SIGINT ELINT |

TABLE 4-continued

Air-Breathing ISR Assets

| System | Platform | Sensor |
|---|---|---|
| | Prophet Ground | ELINT COMINT |

Figure 4:
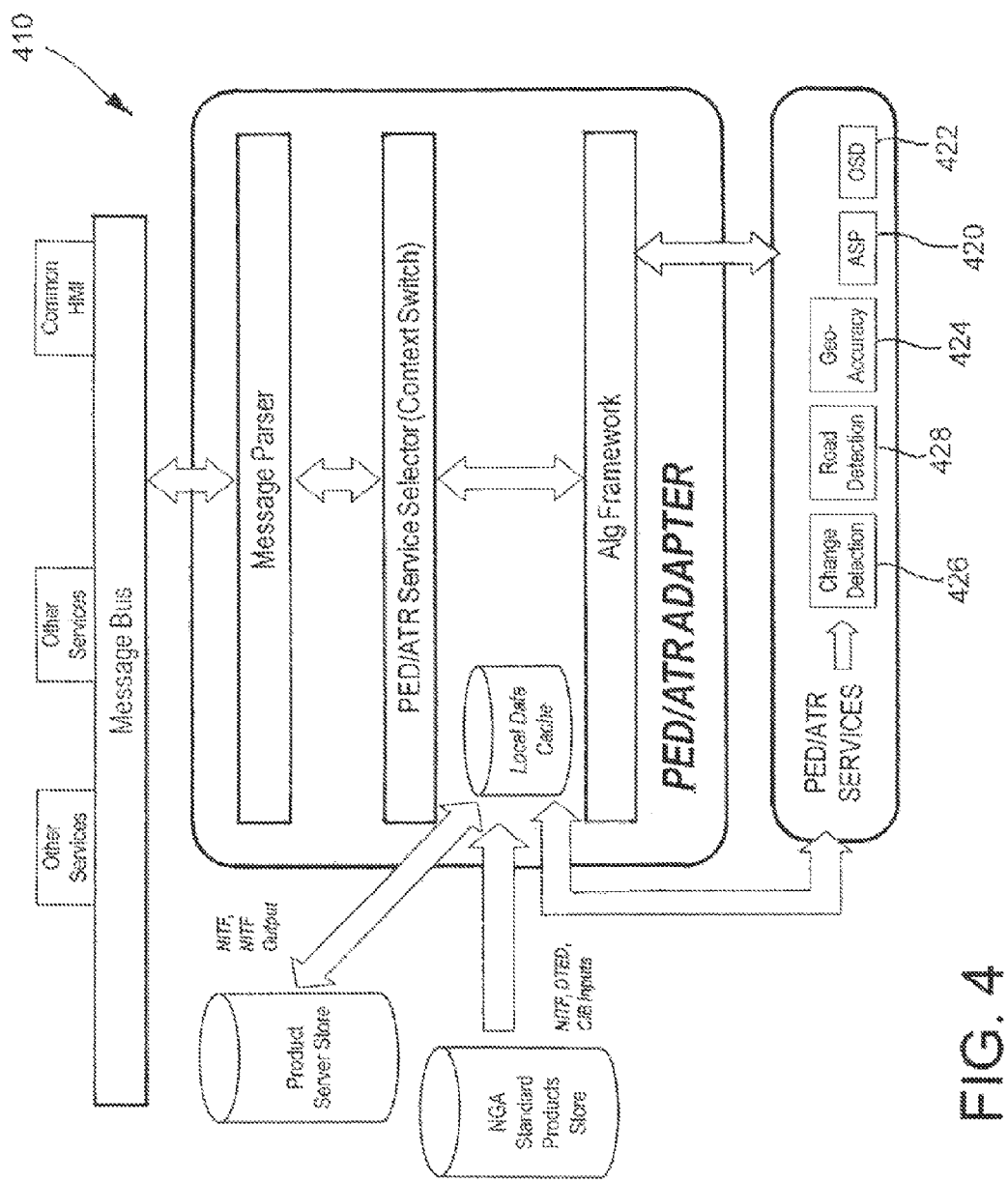
FIG. 4 is a processing exploitation and dissemination (PED)/automatic target recognition (ATR) adapter architecture.

The initial PED algorithms may be used as part of the analytical assessment framework 210 (shown in FIG. 2), and may be integrated through a PED/ATR adapter architecture 410 (shown in FIG. 4). The PED/ATR adapter architecture 410 may include algorithms such as: advanced search protocol 420 (ASP); ocean ship detection (OSD) 422; geo-accuracy service 424; change detection service 426; and/or road detection service 428. The algorithms may be a software program operating on a computer to analyze data, for example a digital photograph or Synthetic-Aperture Radar (SAR) image. The data may be communicated to the algorithms through a computer network or any other suitable means, such as a thumb drive to allow the algorithms to access the data that may have been collected by one of the above sensors.

The advanced search protocol 420 (ASP) may locate small thermal targets in IR land imagery to expedite target detection. The ASP 420 may produce a shapefile of the detections as the final product. Latitude and longitude of the detections may be available for subsequent processes.

The ocean ship detection 422 (OSD) may use statistical measures to locate ships in open ocean and littoral areas using Electro-optical (EO) or Infrared (IR) imagery. A summary of the detections and a shapefile may be created as the final product. Latitude and longitude of the detections may be available for subsequent processes.

The geo-accuracy Service 424 may remove geo-positioning errors of EO imagery by automatically tying the imagery to a controlled image base (CIB) or other available reference data. The output of the photogrammetric process may be used to update or create a National Imagery Transmission Format (NITF) sub header.

The change detection service 426 may compare before and after EO or IR images of the same scene and create a two color multiview image enabling rapid operator awareness and assessment of activity. Autonomous cueing may be supported.

The Road Detection Service 428 may create a shapefile representing the roads and major pathways in an EO image by using a feature-based classifier and image quality attributes. The produced shapefile may be overlaid on the image to highlight roads on an SA display and to facilitate tasking for platform sensors. Extension to other sensor modalities may only require tuning.

The verification phase 140 may apply ABI and/or CD techniques to verify that the exploitation techniques continue to be effective in negating the enemy threat 130 (FIG. 1), for example, the missile threat. In addition to the change detection service 426 applied during the battle damage assessment phase 138, the battle damage phase may apply an ABI multi-INT analytics platform, for example, Intersect Sentry™.

The ABI multi-INT analytics platform 634, which may provide an open source, open standards solution that enables analysts to automate the discovery of important activities. The ABI multi-INT analytics platform 634 may operate on multiple systems and process data from across local or foreign regions. For example, the ABI multi-INT analytics platform 634 may process data coming in through a computer network.

Figure 5:
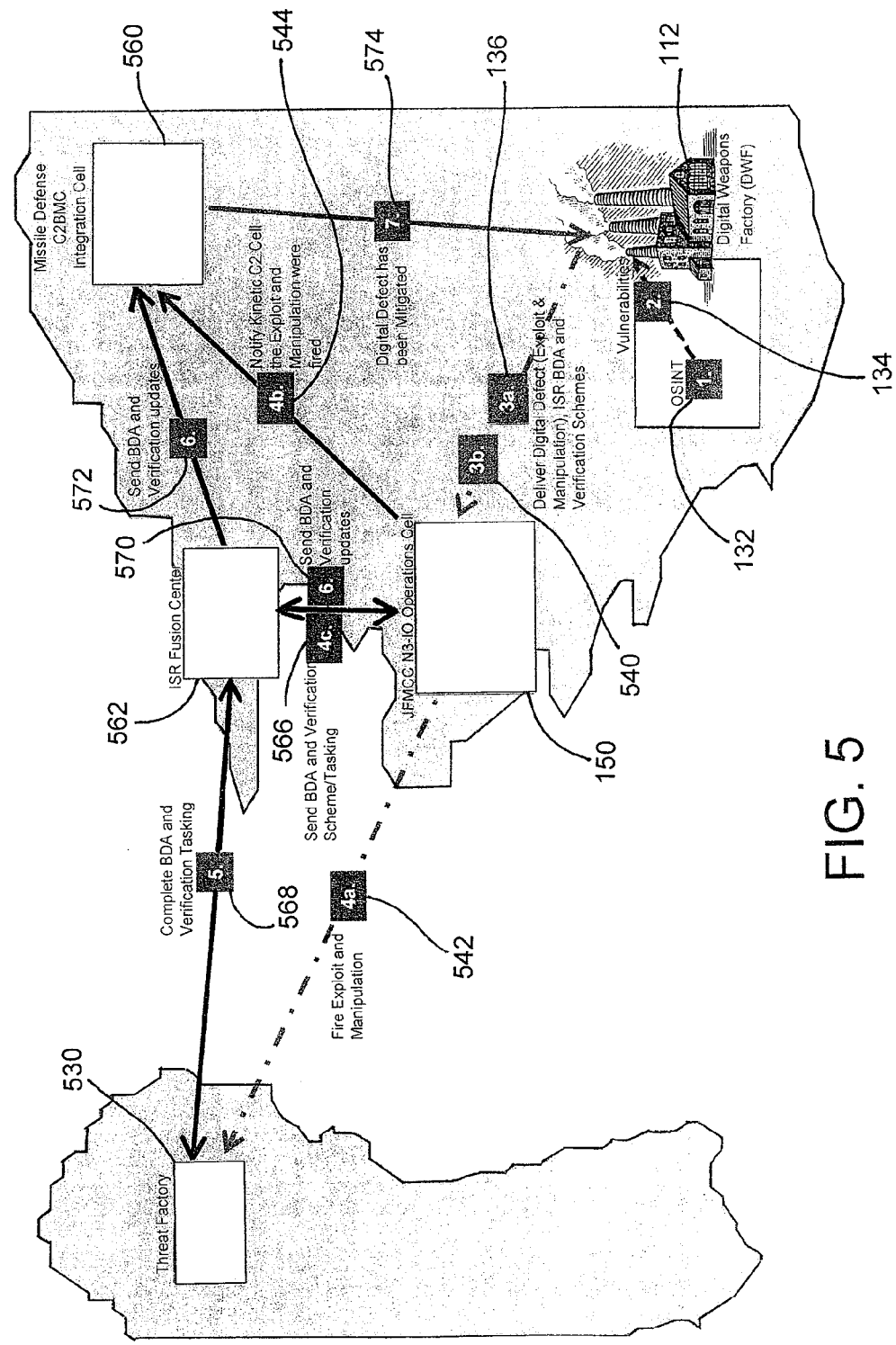
FIG. 5 is an exemplary operational view of the digital weapons factory of FIG. 1 interacting with a plurality of other systems to address a threat.

FIG. 5 is an exemplary operational view of a mission thread the digital weapons factory 112 of FIG. 1 interacting with a plurality of other systems to address an enemy threat 530 (e.g., a threat factory building missiles). The digital weapons factory 112 may first identify the enemy threat 530 through OSINT analysis 132 and associated vulnerabilities through vulnerability assessment 134. Next, the digital weapons factory 112 may perform the techniques assessment 136 to derive techniques that may exploit and/or manipulate the vulnerabilities (e.g., introduce a defect). The BDA 138 may be performed later to verify the techniques exploited the desired vulnerabilities, along with the verification assessment 140. For example, a BDA and verification scheme 540 may be created by the digital weapons factory 112 and communicated to a combat operations cell 150 (e.g., a computer control center, such as the Joint Force Maritime Component Commander (JFMCC) operations cell).

Next, the combat operations cell 150 may deploy 542 the digital defect exploitations and manipulations at the enemy threat 530 while communicating 544 with the C2BMC IM 160 to notify a kinetic C2BMC integration cell 560 of the C2BMC 122 that the digital defect exploits and manipulations were deployed. For example, the kinetic C2BMC integration cell 560 may be a physical operations center and the C2BMC IM 160 may be a computer processor or a software module configured to communicate with the kinetic C2BMC integration cell 560.

Next, the ISR Fusion Center 562 (e.g., an information gathering center including a plurality of networked computers for carrying out data analysis and communications tasks) may receive 566 BDA 138 and/or verification 140 scheme/tasking data from the combat operations cell 150. Next, an ISR Fusion Center 562 may perform 568 (e.g., complete) BDA 138 and Verification 154 assessments of the exploits deployed against the threat factory 530.

The ISR fusion center 562 may next send data based on the BDA 138 and the verification 154 back to the combat operations cells 150, as shown at 570. The ISR fusion center 562 may and send data based on the BDA 138 and verification 154 data to the C2BMC Integration Cell 560, as shown at 572. The steps shown at 570 and 572 may occur simultaneously (e.g., a computer may send the BDA and verification updates to both cells 150, 560 at the same time). If a digital defect is mitigated by the enemy, then the C2BMC Integration Cell 560 may use the C2BMC IM 160 to send a notification 574 that the particular digital defect has been mitigated to the digital weapons factory 112, and the process starting with OSINT 132 may being again.

Figure 6:
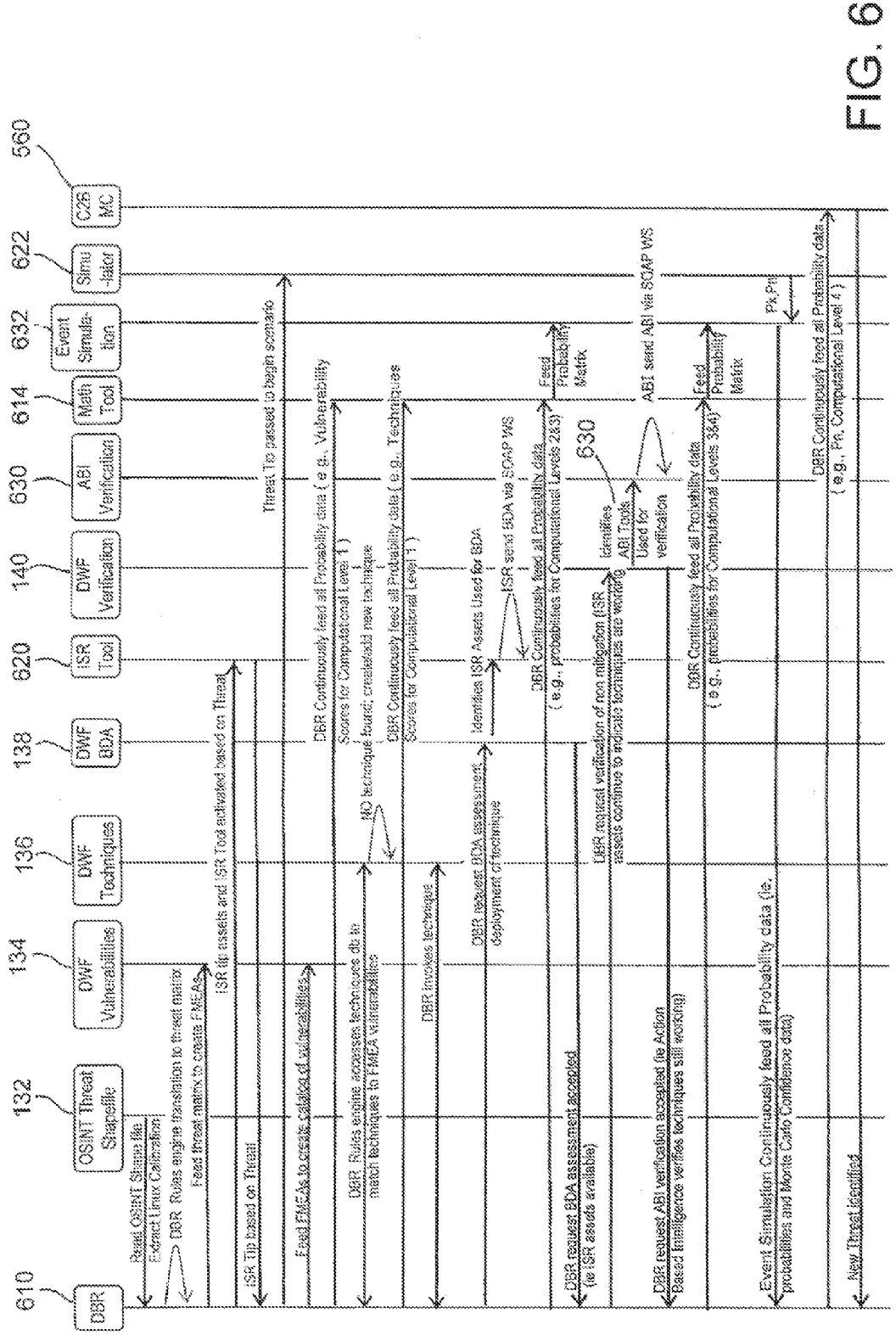
FIG. 6 is a flow chart of the digital weapons factory of FIG. 1 interacting with a plurality of other systems.

FIG. 6 is a flow chart of the digital weapons factory of FIG. 1 interacting with a plurality of other systems to complete the mission thread of FIG. 5. A data broker reasoner 610 (DBR), such as that disclosed in the concurrently-filed U.S. Application, "System and Method for Asymmetric Missile Defense," may be in communication with the digital weapons factory 112, the digital operations center 120, and the C2BMC 122 to allow repeated updating to provide accurate and timely data between each system. An exemplary DBR is disclosed in U.S. application Ser. No. 14/109,059 filed Dec. 17, 2013, which is hereby incorporated by reference in its entirety.

The DBR may interact with the digital weapons factory 112 to identify the threat using OSINT threat analysis 132, to identify vulnerabilities 134 using the FMEA (either from previous FMEA data stored in a historical database or newly derived FMEA data generated by the digital weapons factory 112), and to match the vulnerabilities to digital defects for exploitation and manipulation of the vulnerabilities. If the cyber response tools 114 already exist, then the DBR 610 selects these for deployment from the digital weapons factory 112 database. If these digital defects do not exist, then the DBR may initiate their production by the digital weapons factory 112.

During this point in the process the DBR 610 invokes a mathematical method for non-kinetic performance assessment (M2NPA) tool 614. For example, the DBR 610 may invoke the system and methods described in U.S. application Ser. No. 14/185,029. The M2NPA tool 614 may then pass scores for computing probabilities to be used as input parameters to compute Probability of Negation (Pn) that is later synchronized with probability of kill (Pk) and provided to the C2BMC integration cell.

After the enemy threat 114 is identified, the DBR 610 may notify the C2BMC integration cell, using the C2BMC IM, and activate an ISR tool 620 in order to initiate the deployment and assessment of ISR assets. The ISR tool 620 may then provide tips on enemy movements and enemy assets as the threat scenario progresses, and the ISR tool 620 may quantify the accuracy of these tips. The DBR 610 may also invoke a kinetic missile defense simulator 622 (e.g., RAYTHEON Missile Defense (RMD) tool simulator) and/or a discrete event simulation tool 632 (e.g., ExtendSim). The kinetic missile defense simulator 622 may compute probabilities that missiles are intercepted using conventional kinetic weapons, as well as non-kinetic cyber response tools 114. The discrete event simulation tool 632 may receive probability information, compute confidence intervals associated with this probability information using Monte Carlo analysis, and continuously feed the probability data to the DBR 610.

The DBR 610 may next initiate a battle damage assessment 138 of the digital operations center 120 to include digital defect monitoring, control, and management, as well as verification through ABI 630. The verification may include the ABI 630 sending ABI data via a simple object access protocol workstation. For example, Intersect Sentry™ may be utilized to send ABI information. During this point in the process the DBR 610 may again invoke the M2NPA tool 614 that then may pass BDA 138 and verification 140 probabilities to be incorporated as factors used to compute Bayesian probabilities that comprise Probability of Negation (Pn) that is later synchronized with Probability of Kill (Pk) and provided to the C2BMC integration cell 560.

As the threat scenario proceeds, the DBR may use the C2BMC IM to invoke a discrete event simulator 632 (e.g., ExtendSim) that may provide situational awareness for each step in the integrated digital weapons factory 112, digital operations center 120, and the C2BMC IM 160 system process. The discrete event simulator may receive continuous input from the M2NPA tool 614 and the kinetic simulation tool 622.

In one example, the digital weapons factory 112 may identify a vulnerability, for example a weakness in a missile manufacturing tool in the threat factory 530 (FIG. 5). The DBR 610 may include a rules engine that identifies the vulnerability and searches for techniques (e.g., digital viruses) that may address the vulnerability. For example, if the vulnerability is not accessible by a wireless connection, then techniques requiring a wireless connection may not be searched and only techniques that may be deployed with a hardwired connection may be searched. If a hardwired technique does not exist, then the DBR 610 may create a new technique. For example, the DBR 610 may identify viable techniques that only operate by a wireless connection and modify the techniques to be deployed on a hardwired connection. Creation of new and modification of old techniques may be performed at a rapid pace (e.g., thousands of viable techniques may be created and evaluated within minutes).

Figure 7:
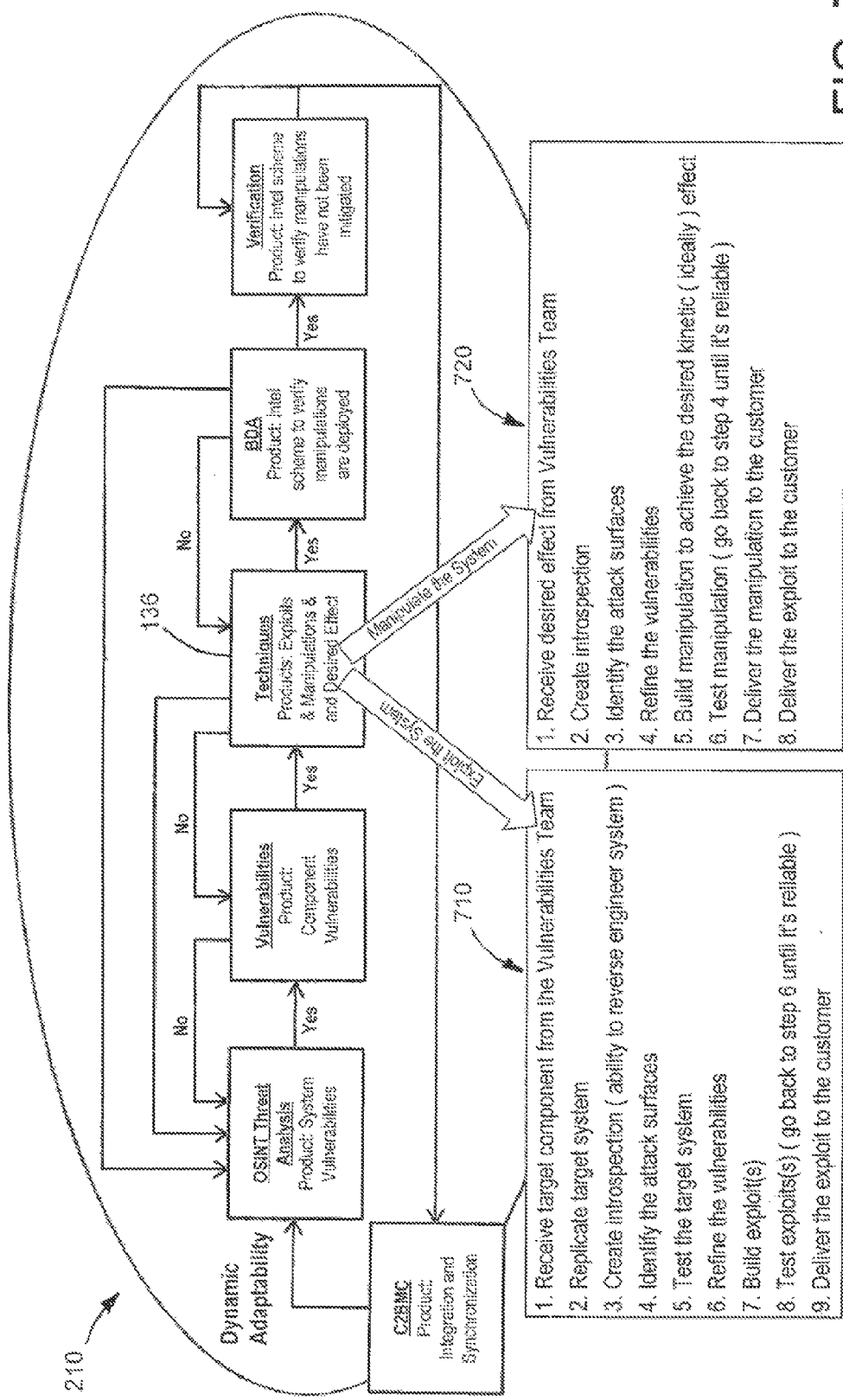
FIG. 7 is a more detailed flow chart of the analytical assessment framework of FIG. 2 that further describes a process of exploiting a system (e.g., an enemy system) and a process of manipulating the system.

FIG. 7 is a more detailed flow chart of the analytical assessment framework 210 that further describes a process of the techniques assessment 136 that may include exploiting a system 710 (e.g., an enemy system) and a process of manipulating the system 720.

Figure 8:
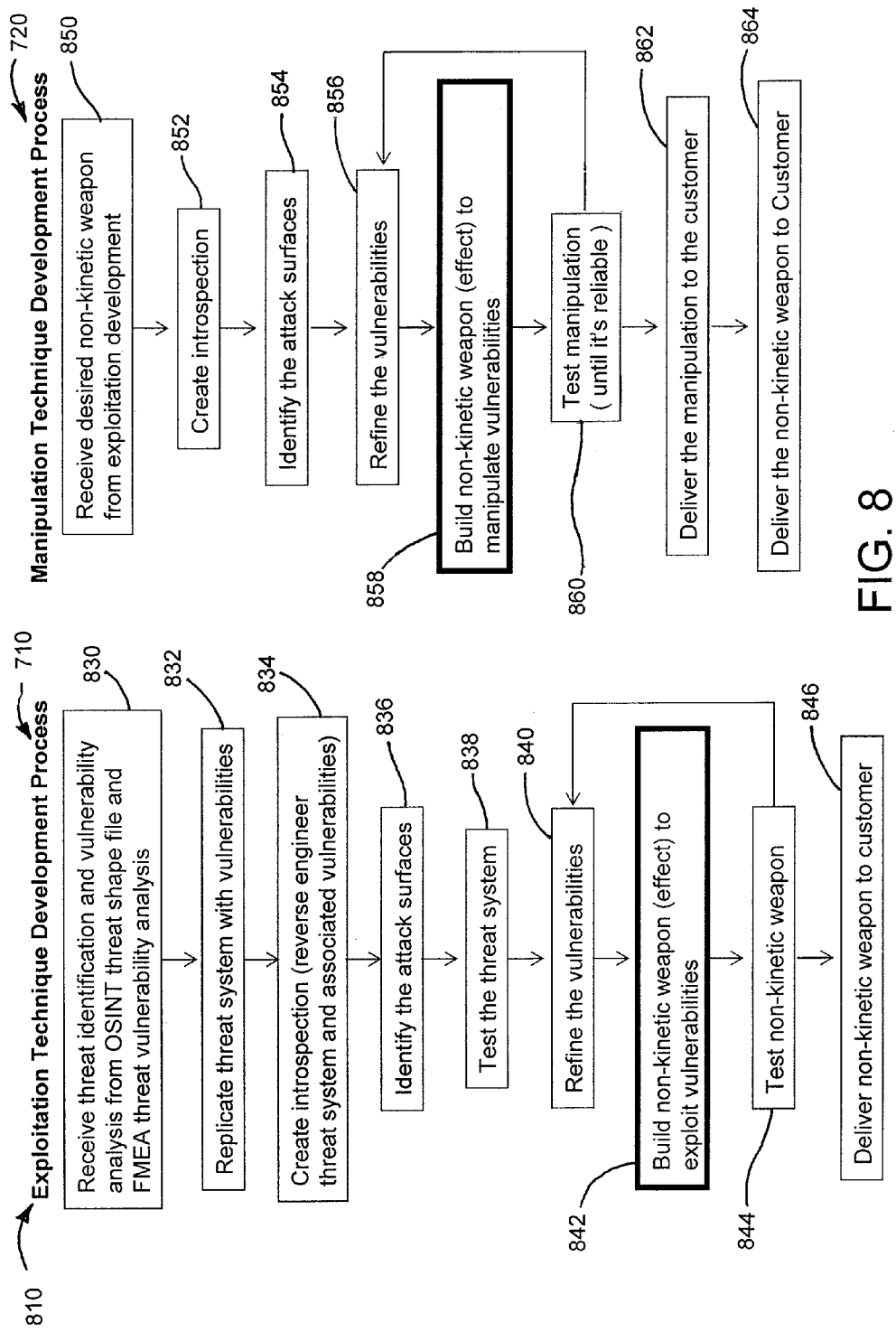
FIG. 8 is a more detailed flow chart of the digital weapons factory of FIG. 6 that further describes the exploitation and manipulation processes.

FIG. 8 is a more detailed flow chart of techniques and development tasks 810 of the digital weapons factory 112 the exploitation process 710 and the manipulation process 720. The exploitation process 710 may include a plurality of steps identified as blocks 830-846.

At block 830, a threat identification may be made from an OSINT threat shape file and a vulnerability analysis may be made by the FMEA. The digital weapons factory 112 may receive the threat identification and vulnerability analysis to allow replication of the identified threat and associated vulnerabilities at block 832. At block 834, the threat (e.g., a computer system) may be reverse engineered and include the associated vulnerabilities. Once the threat is reverse engineered, attack points of entry (e.g., attack surfaces) may be identified at block 836. For example, a point of entry may be a software flaw or a memory storage defect.

At block 838, the threat may be tested. Testing may include verifying that the vulnerability is exploitable. The identified vulnerabilities may be updated or refined at block 840 based on results from testing the threat.

At block 842, a cyber response tool 114 (e.g., a non-kinetic weapon) may be built based on the vulnerabilities. The non-kinetic weapon may be tested at block 844 to ensure the non-kinetic weapon is able to exploit the vulnerabilities. For example, a software program may be automatically built to exploit a known software flaw in a threat with a computer system to allow a control or manipulation to be placed in the computer system. The vulnerabilities may be further refined at block 840 based on the results of the tested non-kinetic weapon. Once testing determines a probability of effectiveness of the non-kinetic weapon meets a threshold level of effectiveness, the non-kinetic weapon may be delivered to a customer (e.g., a government entity) at block 846.

The manipulation process 720 may include a plurality of steps identified as blocks 850-864. At block 850 the digital weapons factory 112 may receive the non-kinetic weapon resulting from block 844. At block 852, the enemy threat 130 (e.g., a computer system) may be reverse engineered and include the associated vulnerabilities. Once the threat is reverse engineered, manipulation attack points (e.g., attack surfaces) may be identified at block 854. For example, a desired manipulation, such as altering digital code of the enemy threat 130 to neutralize the enemy threat 130 or to require an enemy to expend resources to reverse the manipulation.

The identified vulnerabilities may be updated or refined at block 856 based the identified attack surfaces at block 854. At block 858, another non-kinetic effect may be built for the cyber response tool 114 to manipulate the enemy threat 130. The non-kinetic weapon may be tested at block 860 to ensure the non-kinetic weapon is able to exploit the vulnerabilities. For example, a software program may be automatically built and combined with the non-kinetic weapon build to exploit a vulnerability, to manipulate a known software flaw in an enemy threat 130 with a computer system. For example, the manipulation may alter data stored in a control system of the enemy threat 130. The vulnerabilities may be further refined at block 856 based on the results of the tested non-kinetic weapon. Once testing determines a probability of effectiveness of the non-kinetic weapon meets a threshold level of effectiveness, the manipulation non-kinetic weapon may be delivered to a customer (e.g., a government entity) at block 862. At block 864 the entire cyber response tool 114 and/or a portion of the cyber response tool 114 (e.g., the exploitation and manipulation non-kinetic weapons) may be delivered to the customer.

Figure 9:
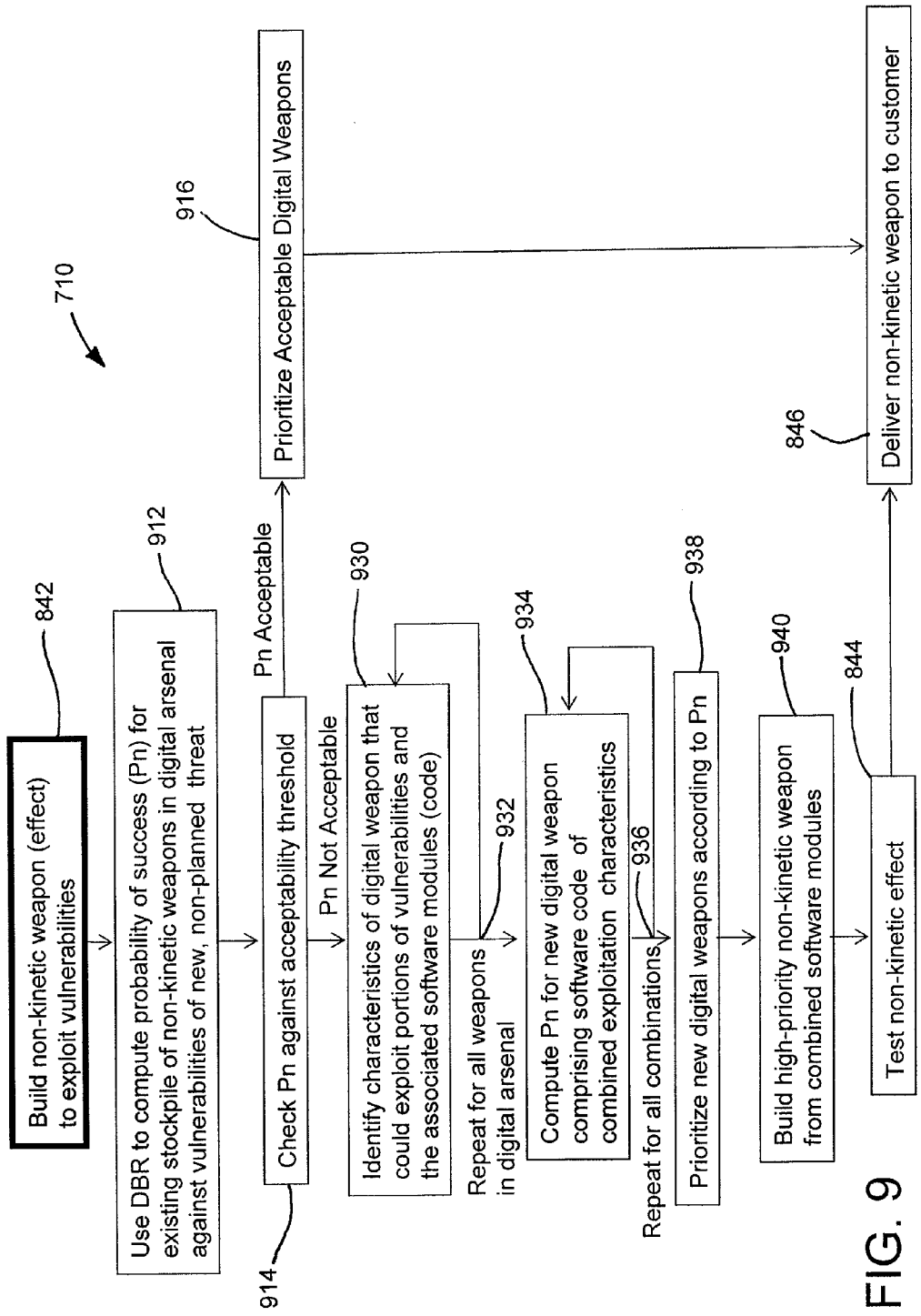
FIG. 9 is a more detailed flow chart of the exploitation process of FIG. 8 that shows how to build a cyber response tool to exploit vulnerabilities for new, non-planned threats.

FIG. 9 is a more detailed flow chart of the exploitation process 710 that shows how to build the cyber response tool 114 to exploit vulnerabilities for new, non-planned threats. At block 912 the DBR 610 may determine a probability of success of existing cyber response tools for a new enemy threat 130 (e.g., a threat that has not been identified before and/or a threat that a cyber response tool has not yet been able to exploit). At block 914 the probability of success of each available cyber response tool may be compared to a threshold, for example a required success rate may be 95%. If one or more available cyber response tools 114 meet the required threshold, then the available cyber response tools 114 (e.g., digital weapon) may be prioritized at block 916. Prioritization may be based on each probability of success. From block 916, the cyber response tools 114 may be provided to the customer. For example, the cyber response tools 114 may be provided in the prioritized order determined at block 916.

If none of the cyber response tools meet the threshold success rate at block 914, then characteristics of a cyber response tool required to exploit portions of the vulnerabilities associated with the enemy threat 130 may be identified at block 930. For example, a computer system or module of the enemy threat 130 may be similar to another enemy threat with an associated effective cyber response tool. Block 930 may be repeated at 932 for each cyber response tool known (e.g., stored in a database, such as a digital arsenal, containing a plurality of existing cyber response tools).

At block 934 a new probability of success may be determined for a combination of characteristics identified at block 930. At 936 the determination at block 934 may be repeated for each combination of characteristics identified. At block 938 each combination may be prioritized based on an associated $P_N$. A new cyber response tool 114 may be built at block 940 based on the identified combinations at block 934. For example, the highest priority combination at block 938 may be built. Once the new cyber response tool 114 is created it may be tested at block 844 and delivered to the customer at block 846 based on the testing.

Figure 10:
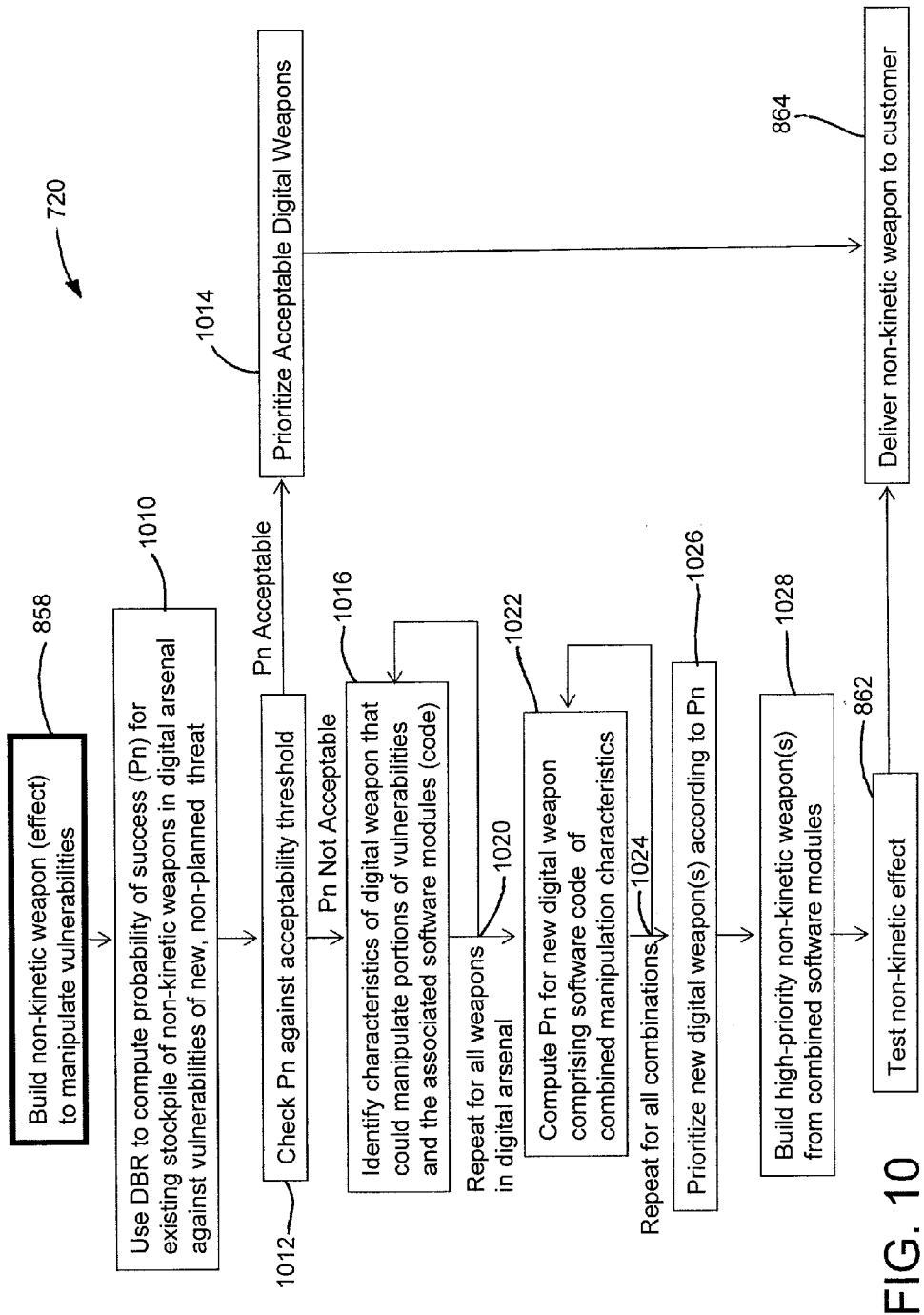
FIG. 10 is a more detailed flow chart of the manipulation process of FIG. 8 that shows how to build a cyber response tool to manipulate vulnerabilities for new, non-planned threats.

FIG. 10 is a more detailed flow chart of the manipulation process 720 that shows how to build the cyber response tool 114 to manipulate vulnerabilities for new, non-planned threats. At block 1010 the DBR 610 may determine a probability of success of existing cyber response tools for a new enemy threat 130 (e.g., a threat that has not been identified before and/or a threat that a cyber response tool has not yet been able to manipulate). At block 1012 the probability of success of each available cyber response tool may be compared to a threshold, for example a required success rate may be 95%. If one or more available cyber response tools 114 meet the required threshold, then the available cyber response tools 114 (e.g., digital weapon) may be prioritized at block 1014. Prioritization may be based on each probability of success to manipulate the enemy threat 130 in a given manner (e.g., alter a control system of the enemy threat 130). From block 1014, the cyber response tools 114 may be provided to the customer. For example, the cyber response tools 114 may be provided in the prioritized order determined at block 1014.

If none of the cyber response tools meet the threshold success rate at block 1012, then characteristics of a cyber response tool required to manipulate portions of the vulnerabilities associated with the enemy threat 130 may be identified at block 1016. For example, a computer system or module of the enemy threat 130 may be similar to another enemy threat with an associated effective cyber response tool. Block 1016 may be repeated at 1020 for each cyber response tool known (e.g., stored in a database, such as a digital arsenal, containing a plurality of existing cyber response tools).

At block 1022 a new probability of success may be determined for a combination of characteristics identified at block 1016. At 1024 the determination at block 1022 may be repeated for each combination of characteristics identified. At block 1026 each combination may be prioritized based on an associated $P_N$. A new cyber response tool 114 may be built at block 1028 based on the identified combinations at block 1022. For example, the highest priority combination at block 1026 may be built. Once the new cyber response tool 114 is created it may be tested at block 862 and delivered to the customer at block 864 based on the testing.

In another example, the digital weapons factory 112 may identify a vulnerability in a computer operating system, such as a processing operation that is susceptible to manipulation. For example, the processing operation may be performed by a WINDOWS® operating system that is vulnerable to outside code modifying a given bit from a 0 to a 1, allowing alteration of raw data being processed by the processing operation. A new WINDOWS® operating system may be employed, or an entirely new operating system may be employed, with a similar vulnerability allowing an alteration of raw data. The DBR 610 may be unable to find a technique that applies to the new operating system, but may combine portions of an exploit that worked against the first WINDOWS® operating system and modify the exploit to be able to apply it for the new operating system.

In yet another example, the digital weapons factory 112 may identify another vulnerability. For example a new enemy threat may emerge, such as a flying tank that utilizes flight control systems similar to an aircraft. The DBR 610 may find vulnerabilities in the flying tank's flight control systems, but may not have a technique that specifically works for the flying tank because a flying tank has not been seen before and may have another system that prevents attacking the flying tank in the same way as an aircraft. The DBR 610 may be unable to find any techniques that apply to the flying tank, or may determine insufficient viable techniques exist. The DBR 610 may next create new techniques that apply to the flying tank, for example combining techniques that worked against aircraft flight control systems and techniques that worked against standard tank manufacturing processes and/or communications systems to disrupt the flying tanks' flight control systems.

The above description refers to a series of analytical processes that may be performed manually or automatically by a computer. In an embodiment, a defense system may perform one or more of the above steps automatically and compute results for each performed step. For example, the defense system may operate on a computer system to process each step. Alternatively, portions of the defense system may operate on separate computers within a computer network comprising a plurality of computers operably connected to one another to process one or more portions of the above steps with the separate computers.

The above embodiments disclose steps that may be incorporated as instructions on a computer. The instructions may be embodied in various forms like routines, algorithms, modules, methods, threads, or programs including separate applications or code from dynamically or statically linked libraries. Software may also be implemented in a variety of executable or loadable forms including, but not limited to, a stand-alone program, a function call (local or remote), a servlet, an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable instructions or executable instructions can be located in one logic or distributed between two or more communicating, co-operating, or parallel processing logics and thus can be loaded or executed in series, parallel, massively parallel and other manners.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of rapidly producing a cyber response tool, the method comprising:
   detecting a threat object, during a first phase, with one or more sensor platforms;
   modeling a lifecycle of the detected threat object;
   identifying vulnerabilities of the lifecycle based on the model;
   providing a set of cyber response tools;
   determining whether each cyber response tool of a set of cyber response tools is effective in exploiting and manipulating the threat vulnerabilities based on an observation of the effectiveness of the cyber response tool by the one or more sensor platforms;
   identifying one or more effective portions of one or more of the cyber response tools that correspond to the identified vulnerabilities;
   creating a new cyber response tool based on the identified vulnerabilities and the one or more effective portions; and
   applying the new cyber response tool to the threat object and/or to a device that is operatively connectable to the threat object.

2. The method of rapidly producing a cyber response tool of claim 1, wherein determining whether each cyber response tool is effective is a function of a probability of success of the cyber response tool against the enemy threat object.

3. The method of rapidly producing a cyber response tool of claim 2, wherein the probability of success is a function of a second phase of the threat object.

4. The method of rapidly producing a cyber response tool of claim 3, wherein the probability of success is based on a first time period.

5. The method of rapidly producing a cyber response tool of claim 4, wherein the threat object includes a missile and the first time period is an amount of time before an expected launch of the missile.

6. The method of rapidly producing a cyber response tool of claim 3, wherein the threat object includes a missile and the second phase is a deployment of the missile.

7. The method of rapidly producing a cyber response tool of claim 1, wherein determining whether each cyber response tool is effective determines that none of the cyber response tools is effective.

8. The method of rapidly producing a cyber response tool of claim 7, wherein identifying one or more effective portions is a function of a current phase of the threat object.

9. The method of rapidly producing a cyber response tool of claim 7, wherein identifying one or more effective portions is a function of time.

10. The method of rapidly producing a cyber response tool of claim 7, wherein identifying one or more effective portions includes identifying a digital control system attack that is effective for attacking a control system module of the threat object.

11. The method of rapidly producing a cyber response tool of claim 10, wherein creating a new cyber response tool includes combining a portion of the digital control system attack with another portion of another cyber response tool.

12. The method of rapidly producing a cyber response tool of claim 1, wherein the new cyber response tool includes a computer virus.

13. The method of rapidly producing a cyber response tool of claim 1, wherein applying the new cyber response tool includes sending the cyber response tool through a computer network to a digital module in the threat object.

14. The method of rapidly producing a cyber response tool of claim 1, wherein applying the new cyber response tool includes sending the cyber response tool through a computer network to a manufacturing device configured to manufacture a portion of the threat object.

15. The method of rapidly producing a cyber response tool of claim 1, wherein the new cyber response tool includes a plurality of portions cyber response tools from the set of cyber response tools.

16. The method of rapidly producing a cyber response tool of claim 1, wherein creating a new cyber response tool includes creating a plurality of new cyber response tools within an hour.

17. The method of rapidly producing a cyber response tool of claim 16, further comprising:
   determining that the plurality of new cyber response tools is effective against one or more of the identified vulnerabilities.

18. The method of rapidly producing a cyber response tool of claim 1, wherein modeling the lifecycle includes a plurality of phases of the threat object.

19. A method of rapidly producing a cyber response tool, the method comprising:

detecting a threat object, during a first phase, with one or more sensor platforms;

modeling a lifecycle of the detected threat object;

identifying vulnerabilities of the lifecycle based on the model;

searching for a cyber response tool in a set of cyber response tools in a database;

determining whether each cyber response tool of a set of cyber response tools is effective in exploiting and manipulating the threat vulnerabilities based on an observation of the effectiveness of the cyber response tool by the one or more sensor platforms;

identifying one or more effective portions of one or more of the cyber response tools that correspond to the identified vulnerabilities;

creating a new cyber response tool based on the identified vulnerabilities and the one or more effective portions; and applying the new cyber response tool to the threat object and/or to a device that is operatively connectable to the threat object.

20. A system for rapidly producing a cyber response tool, the system comprising:

a detection module for detecting a threat object, during a first phase, with one or more sensor platforms;

a modeling module for modeling a lifecycle of the detected threat object;

an identification module for identifying vulnerabilities of the lifecycle based on the model;

a storage module for providing a set of cyber response tools;

a determination module for determining whether each cyber response tool of a set of cyber response tools is effective in exploiting and manipulating the threat vulnerabilities based on an observation of the effectiveness of the cyber response tool by the one or more sensor platforms;

a second identification module for identifying one or more effective portions of one or more of the cyber response tools that correspond to the identified vulnerabilities;

a matching module for creating a new cyber response tool based on the identified vulnerabilities and the one or more effective portions; and an implementation module for applying the new cyber response tool to the threat object and/or to a device that is operatively connectable to the threat object.

* * * * *